United States Patent [19]

Keshi et al.

[11] 4,451,587
[45] May 29, 1984

[54] POLYURETHANE FOAM AND ITS PRODUCTION

[75] Inventors: Akizo Keshi, Takatsuki; Katsuhisa Kodama, Nishinomiya, both of Japan

[73] Assignee: Takeda Chemical Industries, Ltd., Osaka, Japan

[21] Appl. No.: 422,435

[22] Filed: Sep. 23, 1982

[30] Foreign Application Priority Data

Oct. 22, 1981 [JP] Japan .................. 56-169519

[51] Int. Cl.³ .................. C08G 18/14; C08G 18/50
[52] U.S. Cl. .................. 521/171; 521/129; 521/131; 521/160; 521/914
[58] Field of Search .................. 521/171, 914

[56] References Cited

U.S. PATENT DOCUMENTS

| | | | |
|---|---|---|---|
| 3,252,922 | 5/1966 | Degener et al. | 521/171 |
| 3,448,046 | 6/1969 | Schalin | 521/171 |
| 3,546,253 | 12/1970 | Carpenter et al. | 521/171 |
| 4,020,024 | 4/1977 | Walraevens et al. | 521/171 |
| 4,067,911 | 1/1978 | Walraevens et al. | 521/171 |
| 4,072,638 | 2/1978 | Boulet et al. | 521/129 |

*Primary Examiner*—H. S. Cockeram
*Attorney, Agent, or Firm*—Wenderoth, Lind & Ponack

[57] ABSTRACT

A polyurethane foam produced by the reaction of a polyisocyanate and a polyether polyol in the presence of a catalyst, a cell regulating agent and water as a blowing agent, the polyether polyol of which consists of a halogenated polyether polyol (I) of the general formula:

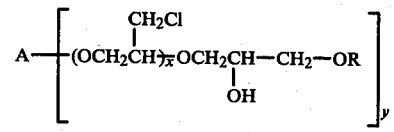

wherein x is a number of 0 to 7; y is a number of 2 to 3; A is a saturated or unsaturated, brominated polyol residue having a number of functional groups of y; R is hydrogen or an alkyl group having 1 to 5 carbon atoms and (II) a polyether polyol having a number of functional groups of 2 to 8, a weight ratio of the added amounts of propylene oxide and ethylene oxide within the range of about 75 to 95/25 to 5 and a hydroxyl number of about 20 to 100 mgKOH/g, whereby a weight ratio of (I) to (II) is about 95 to 25/5 to 75 and the amount of water is about 5 to 20 parts by weight against 100 parts by weight of the polyol component.

The polyurethane foam has uniform and open cells and shows excellent physical properties in compressive strength, tensile strength, excellent sound absorption characteristics and flame resistance, and is therefore used as thermal insulation materials, acoustic absorption materials and shock absorption materials for houses, vehicles, etc.

14 Claims, 2 Drawing Figures

POLYURETHANE FOAM AND ITS PRODUCTION

This invention relates to polyurethane foams with open and uniform cells and production thereof.

Rigid urethane foams which conventionally have been industrially put into wide use have most of their cells closed and gas with a lower thermal conductivity being enclosed in such closed cells thereby to provide the foams with excellent thermal insulation effect, thus being used mainly in the application fields as heat insulation materials. In such rigid urethane foams having the closed cell structure, however, the pressure of the gas in the cells varies with the ambient temperature (the temperature at which such foams are used), and there are observed undesirable phenomena such as shrinkage at low temperatures and swelling at high temperatures, unless the resin membranes constituting the cells show adequately increased strength. For these reasons, attempts are made to reduce the density of foams by decreasing the thickness of resin membranes, but have their own limitations. Further, the closed-cell foams show unsatisfactory sound absorption characteristics, air-permeability, etc. In contrast with them, foams having open cells do not present any problem with regard to strength of resin membranes and provide excellent sound absorption characteristics and air-permeability. Therefore, a great deal of investigation has been made on the right urethane foam having open cells. Yet, there are encountered difficulties such as irregular cell size and collapse of cells under varied foaming conditions, and the fact is that the method for producing rigid foams with stable open-cell structure has not yet been established.

The present inventors, in view of such circumstances, conducted extensive research, and found that a halogenated polyether polyol having a particular structure, when used as the polyol component in the production of a rigid urethane foam by formulating the polyether, polyisocyanate, blowing agent, cell-regulating agent, catalyst, etc., can readily afford a rigid urethane foam with open-cell structure having a uniform, fine cell construction and excellent flame retardance. This finding, followed by further research, led to the finding that there may be obtained a uniform and open cell, rigid or semi-rigid polyurethane foam having excellent physical properties in compressive strength, tensile strength, etc. by the use as the polyol component of a polyol consisting of a halogenated polyether polyol (I) of the general formula:

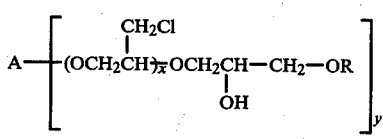

wherein x is a number of 0 to 7; y is a nummber of 2 to 3; A is a saturated or unsaturated, brominated polyol residue having a number of functional groups of y; R is hydrogen or an alkyl group having 1 to 5 carbon atoms and (II) a polyether polyol having a number of functional groups of 2 to 8, a weight ratio of the added amounts of propylene oxide and ethylene oxide within the range of 75 to 95/25 to 5 and a hydroxyl number of about 20 to 100 mgKOH/g in such a proportion that a weight ratio of (I) to (II) may be about 95 to 25/5 to 75, and these findings have culminated in the completion of this invention.

Thus, the principal object of this invention is to provide a polyurethane foam produced by the reaction of a polyisocyanate and a polyether polyol in the presence of a catalyst, a cell regulating agent and water as a blowing agent, the polyether polyol of which consists of a halogenated polyether polyol (I) of the general formula:

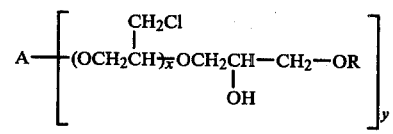

wherein x is a number of 0 to 7; y is a number of 2 to 3; A is a saturated or unsaturated, brominated polyol residue having a number of functional groups of y; R is hydrogen or an alkyl group having 1 to 5 carbon atoms and (II) a polyether polyol having a number of functional groups of 2 to 8, a weight ratio of the added amounts of propylene oxide and ethylene oxide within the range of about 75 to 95/25 to 5 and a hydroxyl number of about 20 to 100 mgKOH/g, whereby a weight ratio of (I) to (II) is about 95 to 25/5 to 75 and the amount of water is about 5 to 20 parts by weight against 100 parts by weight of the polyol component.

Another object of this invention is to provide a process for producing the said polyurethane foam by the use of the halogenated polyether polyol (I) and the polyether polyol (II) in a particular amount.

Figure 1:
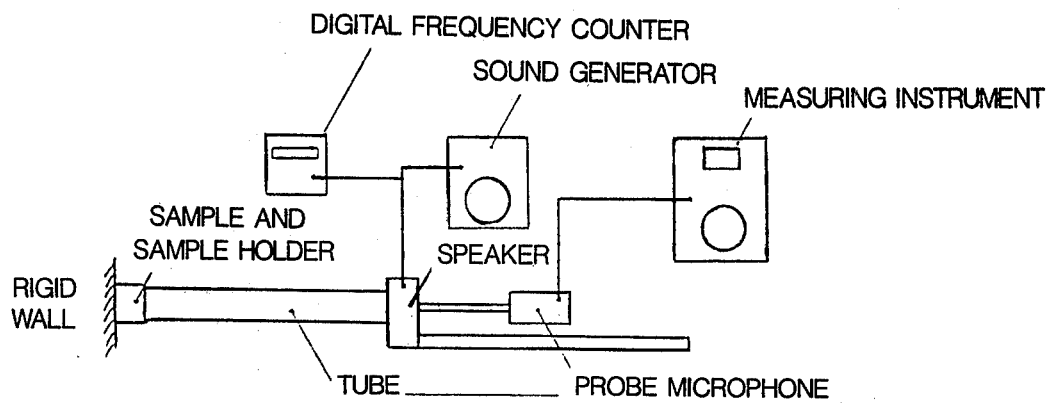
FIG. 1 is a schematic of an apparatus for measuring the normal incident sound absorption coefficient of specimens of foams according to Japanese Industrial Standard A1405.

Examples of the halogenated polyether polyols (I) which are useful in this invention include polyether polyols of the following formula (e.g., those as described in U.S. Pat. Nos. 4,020,024 4,067,911 and 4,072,638).

The halogenated polyether polyol represented by the above-described formula is obtained for example by subjecting a polyglycidyl ether of an epichlorohydrin oligomer of the general formula as described below:

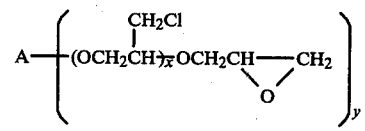

wherein x, y and A are as defined above to hydrolysis in a diluted acidic medium (e.g., nitric acid, perchloric acid, etc.) or to alcoholysis with use of monohydric aliphatic alcohol having 1 to 5 carbon atoms (e.g., methanol, ethanol, propan-1-ol, tert-butyl alcohol, etc.).

The polyglycidyl ether of an epichlorohydrin oligomer represented by the above formula is produced, in accordance with the method known per se, by the dehydrochlorination of halogenated polyether polyols having terminal chlorohydrin groups as obtained by the oligomerization of epichlorohydrin which is initiated by a saturated or unsaturated, brominated aliphatic dihydroxy compound having 2 to 6 carbon atoms.

Thus, such polyglycidyl ether is obtained by subjecting to dehydrochlorination halogenated polyether polyols as obtained by the oligomerization of epichlorohydrin which is initiated by saturated or unsaturated, brominated diols such as glycerin monobromohydrin, 3,4-dibromo-butane-1,2-diol, 2,3-dibromobutane-1,4-diol, 2,3-dibromo-but-2-ene-1,4-diols, 3,4-dibromo-but-2-ene-1,2-diols, 2,2-bis-bromomethyl-propane-1,3-diol and 1,2,5,6-tetrabromohexane-3,4-diol or triols such as bromopentaerythritol.

Examples of the polyether polyols (II) which are useful in this invention include polyether polyols having a hydroxyl number of about 20 to 100 mgKOH/g obtained by conducting the addition-polymerization of propylene oxide and ethylene oxide to active-hydrogen containing compounds such as ethylene glycol, propylene glycol, diethylene glycol, glycerin, trimethylolpropane, triethanolamine, pentaerythritol, $\alpha$-methylglucoside, tolylenediamine, 4,4'-diphenylmethanediamine, xylitol and sorbitol especially in such quantities as their weight ratio may be about 75 to 95/25 to 5, preferably about 80 to 90/20 to 10. The order of the addition of propylene oxide and ethylene oxide is not specifically restricted, and such polyols, for example, may be any of a so-called "EO-tip" type of products from polymerization of propylene oxide, followed by block polymerization of ethylene oxide, as is the case with the common practice, blocks of ethylene oxide polymers being dispersed in the propylene oxide chain or random-copolymerized products.

The mixing ratio of the halogenated polyether polyol (I) to the polyether polyol (II) is about 95 to 25 of the former against 5 to 75 of the latter, preferably in the range of about 85 to 40 against 15 to 60, on a weight ratio basis.

In this invention, water is used as the blowing agent. Water is employed in proportions of about 5 to 20 parts by weight, particularly about 6 to 15 parts by weight, against 100 parts by weight of the polyol component. In cases in which the amount of water to be used is less than 5 parts by weight, there is formed the closed cell structure and shrinkage of foams and so forth readily take place. In the case of the amount of water in excess of 20 parts by weight, on the other hand, there are observed undesirable phenomena such as collapse of a foam during foaming.

In this invention, use can be made of chlorinated fluorinated hydrocarbons, such as trichlorofluoromethane and dichlorodifluoromethane, and so forth as the blowing agent in combination with water.

The amount of these compounds is in the range of about 0 to 60 parts by weight against 100 parts by weight of the polyol component.

Commonly, the chlorinated-fluorinated hydrocarbon based blowing agent is not used or may be used in small quantities in the case of manufacture of less thick layers of foam such as spray foaming, whereas in the case of foaming into block-shaped foams where heat is accumulated inside the foam, the use of such blowing agent in about 40 to 60 parts by weight leads to lessened evolution of steam, etc. The amount of the blowing agent is properly selected in accordance with the required density of foams, method of application, and so forth.

As the polyisocyanate component which is useful in this invention use can be made for example of tolylene diisocyanate, diphenylmethane diisocyanate, 1,5-naphthylene diisocyanate, polymethylenepolyphenylene polyisocyanate (c-MDI) and crude tolylene diisocyanate as well as the so-called prepolymers obtained by the reaction thereof with a polyol in excess of the polyisocyanate. Among these, the most preferred polyisocyanate component is c-MDI.

The amount (NCO index) of the polyisocyanate to be used in this invention is not specifically restricted, but normally is in the proportions of about 0.4 to 1 equivalent particularly preferably in the range of about 0.6 to 0.8 equivalent, against 1 equivalent of active hydrogen of the polyol component and water employed as a blowing agent.

Examples of the catalysts which are useful in this invention include tertiary amines such as methylmorpholine, ethylmorpholine, triethylamine, dimethylethanolamine, dimethylcyclohexylamine, tetramethylethylenediamine, tetramethylpropanediamine, tetramethylhexanediamine, pentamethyldiethylenetriamine and triethylenediamine. Among these, dimethylcyclohexylamine and tetramethylhexanediamine are particularly preferable. The amount of the catalyst to be used is properly selected in accordance with the foaming techniques, required reactivity of foams, etc., but normally is in the range of about 0.5 to 10 parts by weight against 100 parts by weight of the polyol component.

As the cell regulating agent which is useful in this invention, there may be mentioned silicone based cell regulating agents which are commonly utilized for the manufacture of urethane foams, whereas there is no need to use special silicone oils having the cell-opening effect.

Besides the catalyst and cell-regulating agent, for example, stabilizer, filler, pigment, etc. may be added, if necessary.

According to this invention, rigid or semi-rigid polyurethane foams are obtained by reacting the halogenated polyether polyol (I), polyether polyol (II) and water with the polyisocyanate in the presence of the catalyst and cell-regulating agent.

The reaction is conducted by the means known per se such as one shot technique method utilizing a prepolymer or frothing technique.

According to this invention, polyurethane foams having physical properties within the range from the rigid- to semi-rigid foam are readily obtained by properly varying the type and mixing ratio of the polyol components (I) and (II) or the type and amount of the polyisocyanate. Generally, the more the polyol component (I) is used and the higher the NCO index becomes, greater the rigid-foam character is, while conversely, the more the polyol component (II) and the lower the NCO index, the greater the flexible-foam character.

The polyurethane foams of this invention have uniform and open cells and show very low density of about 7 kg/m$^3$ to 25 kg/m$^3$.

In addition, the polyurethane foams of this invention possess excellent physical properties in compressive strength and tensile strength and excellent sound absorption characteristics and flame resistance, and are therefore used as thermal insulation materials, acoustic absorption materials and shock absorption materials for houses, vehicles, etc.

The examples are described below to illustrate this invention more specifically, whereby Ixol B-251 and Ixol M-125 are the halogenated polyether polyol produced by Solvay & Cie. in accordance with the procedure as described U.S. Pat. Nos. 4,020,024, 4,067,911 and 4,072,638, and show the following typical properties; Ixol B-251 (A;

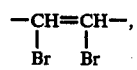

x·y=2.5, MeOH/H₂O=1/1) exhibits an OH No. of 335 mgKOH/g, viscosity (25° C.) of 6500 mPa·sec., Br content of 32% and Cl content of 7%, and Ixol M-125 (A;

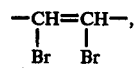

x·y=2.5, MeOH) is a halogenated polyether polyol having an OH No. of 235 mgKOH/g, viscosity (25° C.) of about 2500 mPa·sec, Br content of 33% and Cl content of 7%.

EXAMPLE 1

Into a 2 l plastic beaker with a handle were weighed 50 g of Ixol B-251, 50 g of glycerol based polyether polyol with a PO content of 85 wt %, EO content of 15 wt % and OH number of 56, 3 g of silicone surfactant F-305 ® (Shin-Etsu Chemical Co., Ltd.), 2.6 g of dimethylcyclohexylamine, 8 g of water and 40 g of trichlorofluoromethane, which were then stirred uniformly. 102 g of polymethylenepolyphenylene polyisocyanate (c-MDI with an NCO index of 0.6) was charged and stirred uniformly, and the mixture was poured into a box measuring 25 cm by 25 cm by 20 cm. With the temperature of each liquid being adjusted at 20° C., the reactivity of the mixture was a cream time of 10 seconds and gel time of 36 seconds, and the resultant foam was the entirely open-cell foam having a very fine cell structure, 11.8 kg/m³ of density and 0% of closed cell content, which showed 1.08 N/cm² of DIN 65% compressive strength, 2.74 N/cm² of tensile strength and 74% of elongation.

EXAMPLE 2

By the same procedure as in Example 1, 75 g of Ixol B-251, 25 g of glycerol based polyether polyol with a PO content of 85 wt %, EO content of 15 wt % and OH number of 40, 3 g of silicone surfactant F-305 ®, 2.6 g of dimethylcyclohexylamine, 10 g of water and 40 g of trichlorofluoromethane were reacted with 130 g of c-MDI (NCO index of 0.6). The resultant foam, with its reactivity of 10 seconds in cream time and 37 seconds in gel time, showed 10.3 kg/m³ of density, 1.27 N/cm² of compressive strength, 0% of closed cell content, 1.76 N/cm² of tensile strength and 67% of elongation.

EXAMPLE 3

By the same procedure as in Example 1, 25 g of Ixol B-251, 75 g of a glycerol based polyether polyol consisting of 90 wt % of PO and 10 wt % of EO and having secondary terminal hydroxyl groups and an OH number of 56, 3 g of silicone surfactant F-305 ®, 1 g of silicone surfactant F-230 ® (Shin-Etsu Chemical Co., Ltd.), 8 g of water and 50 g of trichlorofluoromethane were reacted with 76 g of c-MDI (NCO index of 0.5). The resultant foam, with its reactivity of 8 seconds in cream time and 46 seconds in gel time, showed a uniform, fine cell structure and 10.5 kg/m³ of density.

EXAMPLE 4

By the same procedure as in Example 1, 50 g of Ixol M-125, 50 g of glycerol based polyether polyol used in Example 1, 3.0 g of silicone surfactant F-305 ®, 12 g of water, 2.5 g of dimethylcyclohexylamine and 40 parts of trichlorofluoromethane were mixed, and 129 g of c-MDI (NCO index of 0.6) was further added to the mixture, which was then stirred vigorously for 10 seconds and poured into a box to allow foaming in the same manner as in Example 1. There was obtained a foam with a uniform, fine cell structure, with the foaming conditions of 18 seconds in cream time, 37 seconds in gel time and 46 seconds in rise time. The foam showed 11.2 kg/m³ of density, 0% of closed cell content and 0.0379 W/m²·K) of thermal conductivity (24° C.).

EXAMPLES 5 through 7 and Comparative Examples 1 and 2

By the same procedure as in Example 1, foaming was conducted with the formulations as shown in Table 1. The polyether polyols A, B, C, D and E as used for blending are the polyethers showing the following typical properties:

|   | No. of functional groups | OH No. (mg KOH/g) | EO % |
|---|---|---|---|
| A | 3 | 40 | 15 |
| B | 4.5 | 42 | 10 |
| C | 3 | 38 | 33 |
| D | 2 | 29 | 14 |
| E | 2 | 29 | 27 |

TABLE 1

|  | Example 5 | Example 6 | Comparative Example 1 | Example 7 | Comparative Example 2 |
|---|---|---|---|---|---|
| B-251 | 50 | 50 | 50 | 50 | 50 |
| Polyol A | 50 | | | | |
| Polyol B | | 50 | | | |
| Polyol C | | | 50 | | |
| Polyol D | | | | 50 | |
| Polyol E | | | | | 50 |
| Silicone surfactant | | | | | |
| F-305 ® | 3.0 | 3.0 | 3.0 | 3.0 | 3.0 |
| water | 12.0 | 8.0 | 8.0 | 8.0 | 8.0 |
| dimethylcyclohexylamine | 3.0 | 2.0 | 3.0 | 3.0 | 3.0 |
| trichlorofluoromethane | 0 | 40 | 40 | 40 | 40 |
| C-MDI | 137 | 101 | 100 | 100 | 100 |
| (NCO Index) | 0.6 | 0.6 | 0.6 | 0.6 | 0.6 |
| Reactivity (second) | | | | | |
| CT | 10 | 15 | 8 | 10 | 12 |
| GT | 23 | 53 | 31 | 39 | 34 |

TABLE 1-continued

| | Example 5 | Example 6 | Comparative Example 1 | Example 7 | Comparative Example 2 |
|---|---|---|---|---|---|
| RT | 30 | 63 | 49 | 52 | 48 |
| TFT | — | 76 | 43 | 46 | 42 |
| Appearance | Good | Good | Shrinked | Good | Shrinked |
| Cell structure | Uniform and open cell | Uniform and open cell | — | Uniform and open cell | — |
| Foam density (kg/m$^3$) | 18.2 | 11.5 | — | 11.0 | — |
| 5% Compressive strength (N/cm$^2$) | 0.74 | 0.61 | — | 0.75 | — |
| 25% Compressive strength (N/cm$^2$) | 1.23 | 0.69 | — | 0.80 | — |
| 65% Compressive strength (N/cm$^2$) | 2.33 | 1.17 | — | 1.18 | — |

As may be obvious from Table 1, the EO based polyether polyols used in this invention, when their EO added amounts were not less than 27%, yielded shrinked foams and failed to produce the desired, good open-cell foam of this invention.

Measurement of "Normal incident sound absorption coefficient"

By the same procedure as in Example 2, 75 g of Ixol B-251, 25 g of glycerol based polyether polyol with a PO content of 85 wt %, EO content of 15 wt % and OH number of 40, 3 g of silicone surfactant F-305 ®, 2.6 g of dimethylcyclohexyl amine, 10 g of water and 40 g of trichlorofluoromethane were reacted with 130 g of c-MDI. The resultant foam showed 10.2 kg/m$^3$ of density.

Test specimens of 99 mm (for 100–1600 Hz) and 29 mm (for 800–5000 Hz) in diameter were respectively punched out of the above foams of 50 mm (Sample A) and 30 mm (Sample B) in thickness.

These test specimens were respectively set as FIG. 1 and "normal incident sound absorption coefficient" of the respective specimens was measured according to Japanese Industrial Standard A1405 "Methods of Test for Sound Absorption of Acoustical Materials by the Tube Method".

Figure 2:
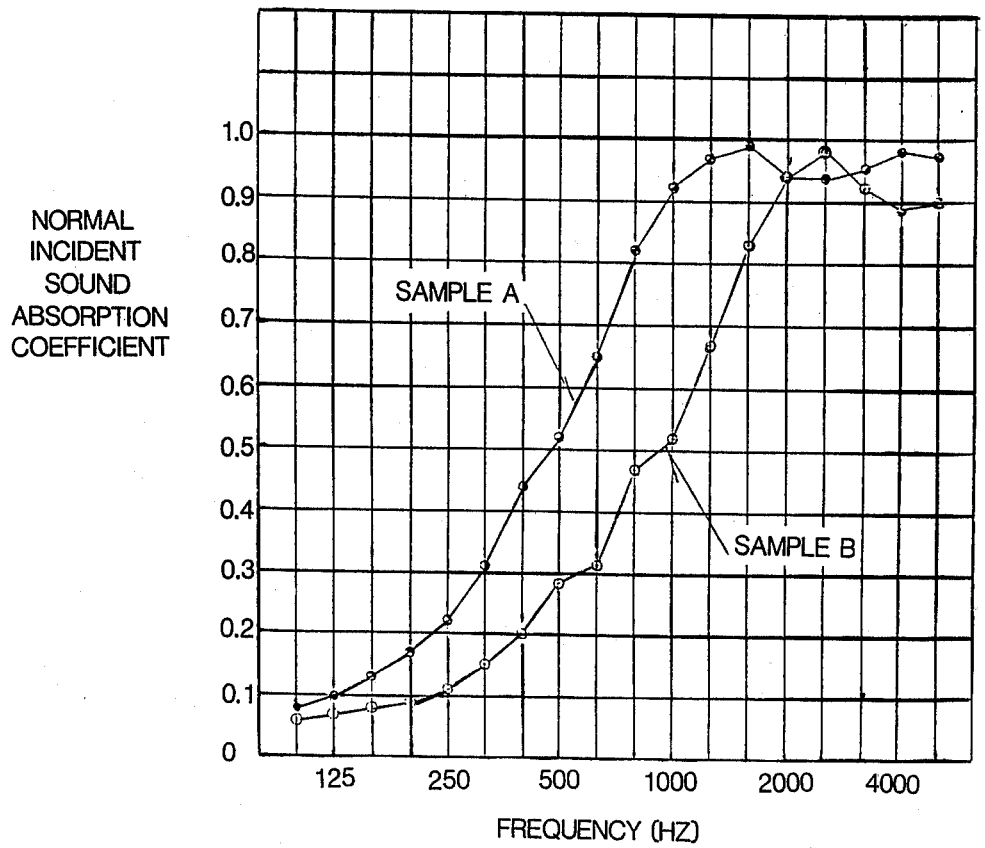
FIG. 2 is a graph showing the Normal Incident Sound Absorption coefficient at certain frequencies of test specimens A and B.

The results are shown in Table 2 and FIG. 2.

TABLE 2

| Frequency (Hz) | Sample A | | Sample B | |
|---|---|---|---|---|
| | φ 99 mm | φ 29 mm | φ 99 mm | φ 29 mm |
| Normal incident sound absorption coefficient | | | | |
| 100 | 0.08 | | 0.06 | |
| 125 | 0.10 | | 0.07 | |
| 160 | 0.13 | | 0.08 | |
| 200 | 0.17 | | 0.09 | |
| 250 | 0.22 | | 0.11 | |
| 315 | 0.31 | | 0.15 | |
| 400 | 0.44 | | 0.20 | |
| 500 | 0.52 | | 0.28 | |
| 630 | 0.65 | | 0.31 | |
| 800 | 0.77 | 0.87 | 0.41 | 0.52 |
| 1,000 | 0.88 | 0.96 | 0.46 | 0.57 |
| 1,250 | 0.94 | 0.99 | 0.63 | 0.71 |
| 1,600 | 0.98 | 0.99 | 0.78 | 0.88 |
| 2,000 | | 0.94 | | 0.94 |
| 2,500 | | 0.94 | | 0.98 |
| 3,150 | | 0.95 | | 0.92 |
| 4,000 | | 0.98 | | 0.89 |
| 5,000 | | 0.97 | | 0.90 |

What is claimed is:

1. A polyurethane foam produced by the reaction of a polyisocyanate and a polyether polyol in the presence of a catalyst, a cell regulating agent and a blowing agent comprising water, the polyether polyol of which consists of a halogenated polyether polyol (I) of the general formula:

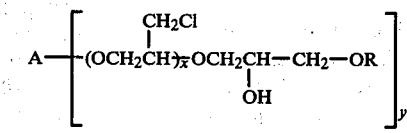

wherein x is a number of 0 to 7; y is a number of 2 to 3; A is a saturated or unsaturated, brominated polyol residue having a number of functional groups of y; and R is hydrogen or an alkyl group having 1 to 5 carbon atoms and (II) polyether polyol having a number of functional groups of 2 to 8, a weight ratio of the added amounts of propylene oxide and ethylene oxide within the range of 75 to 95/25 to 5 and a hydroxyl number of about 20 to 100 mgKOH/g, whereby the weight ratio of (I) to (II) is 95 to 25/5 to 75 and the amount of water is 5 to 20 parts by weight against 100 parts by weight of the polyol component.

2. A polyurethane foam claimed in claim 1, wherein the weight ratio of the added amounts of propylene oxide and ethylene oxide of the polyether polyol (II) is within the range of 80 to 90/20 to 10.

3. A polyurethane foam claimed in claim 1, wherein the weight ratio of the halogenated polyether polyol (I) to the polyether polyol (II) is within the range of 85 to 40/15 to 60.

4. A polyurethane foam claimed in claim 1, wherein the amount of water is 6 to 15 parts by weight against 100 parts by weight of the polyol component.

5. A polyurethane foam claimed in claim 1, wherein the amount of the polyisocyanate is within the range of 0.4 to 1 equivalent against 1 equivalent of active hydrogen of the polyol component and water.

6. A polyurethane foam claimed in claim 1, wherein the amount of the polyisocyanate is within the range of 0.6 to 0.8 equivalent against 1 equivalent of active hydrogen of the polyol component and water.

7. A polyurethane foam claimed in claim 1, wherein the polyisocyanate is polymethylenepolyphenylene polyisocyanate.

8. A process for producing a polyurethane foam, which comprises reacting (1) a polyol, as the polyol component, consisting of a halogenated polyether polyol (I) of the general formula:

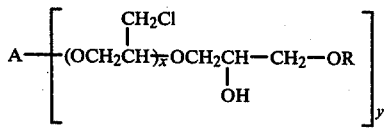

wherein x is a number of 0 to 7; y is a number of 2 to 3; A is a saturated or unsaturated, brominated polyol residue having a number of functional groups of y; and R is hydrogen or an alkyl group having 1 to 5 carbon atoms and (II) polyether polyol having a number of functional groups of 2 to 8, a weight ratio of the added amount of propylene oxide and ethylene oxide within the range of 75 to 95/25 to 5 and a hydroxyl number of 20 to 100 mgKOH/g, whereby a weight ratio of (I) to (II) is 95 to 25/5 to 75, and (2) a blowing agent comprising water, the content of water being 5 to 20 parts by weight against 100 parts by weight of the polyol component, with (3) a polyisocyanate in the presence of a catalyst and a cell regulating agent.

9. A process as claimed in claim 8, wherein the weight ratio of the added amounts of propylene oxide and ethylene oxide of the polyether polyol (II) is within the range of 80 to 90/20 to 10.

10. A process as claimed in claim 8, wherein the weight ratio of the halogenated polyether polyol (I) to the polyether polyol (II) is within the range of 85 to 40/15 to 60.

11. A process as claimed in claim 8, wherein the amount of water is 6 to 15 parts by weight against 100 parts by weight of the polyol component.

12. A process as claimed in claim 8, wherein the amount of the polyisocyanate is within the range of 0.4 to 1 equivalent against 1 equivalent of active hydrogen of the polyol component and water.

13. A process as claimed in claim 8, wherein the amount of the polyisocyanate is within the range of 0.6 to 0.8 equivalent against 1 equivalent of active hydrogen of the polyol component and water.

14. A process as claimed in claim 8, wherein the polyisocyanate is polymethylenepolyphenylene polyisocyanate.

* * * * *